US012772124B2

(12) United States Patent
Sharma et al.

(10) Patent No.: US 12,772,124 B2
(45) Date of Patent: Oct. 20, 2026

(54) COMMUNICATIONS DEVICE, INFRASTRUCTURE EQUIPMENT, CORE NETWORK ELEMENT AND METHODS

(71) Applicant: Sony Group Corporation, Tokyo (JP)

(72) Inventors: Vivek Sharma, Basingstoke (GB); Yuxin Wei, Basingstoke (GB); Hideji Wakabayashi, Basingstoke (GB); Yassin Aden Awad, Basingstoke (GB); Lars Nord, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 890 days.

(21) Appl. No.: 17/629,415

(22) PCT Filed: Jul. 6, 2020

(86) PCT No.: PCT/EP2020/069012
§ 371 (c)(1),
(2) Date: Jan. 24, 2022

(87) PCT Pub. No.: WO2021/018519
PCT Pub. Date: Feb. 4, 2021

(65) Prior Publication Data

US 2022/0303846 A1 Sep. 22, 2022

(30) Foreign Application Priority Data

Jul. 31, 2019 (EP) .................................... 19189361

(51) Int. Cl.
*H04W 36/04* (2009.01)
*H04W 48/04* (2009.01)

(52) U.S. Cl.
CPC .......... *H04W 36/04* (2013.01); *H04W 48/04* (2013.01)

(58) Field of Classification Search
CPC ..... H04W 36/04; H04W 48/04; H04W 48/12; H04W 48/18; H04W 8/186
See application file for complete search history.

(56) References Cited

U.S. PATENT DOCUMENTS

2011/0039558 A1* 2/2011 Lee ...................... H04W 48/20 455/434
2011/0217978 A1 9/2011 Horn
(Continued)

FOREIGN PATENT DOCUMENTS

CN 104255064 A 12/2014
EP 0781064 A2 6/1997
(Continued)

OTHER PUBLICATIONS

International Search Report and Written Opinion mailed on Oct. 1, 2020, received for PCT Application PCT/EP2020/069012, Filed on Jul. 6, 2020, 14 pages.
(Continued)

*Primary Examiner* — Jeanette J Parker
*Assistant Examiner* — Dung L Lam
(74) *Attorney, Agent, or Firm* — Xsensus, LLP

(57) ABSTRACT

A method of selecting a cell in a wireless communications network by a communications device, the method comprising receiving system information associated with a candidate cell, the system information comprising a logical portion indication indicating one or more logical portion identities corresponding to respective logical portions of the wireless communications network which can be accessed in the candidate cell, determining that the candidate cell is a non-public cell to which access is restricted, determining that the communications device is not permitted to access any of the logical portions identified in the logical portion indication, and in response to determining that the communications device is not permitted to access any of the logical
(Continued)

portions identified in the logical portion indication, selecting as a new serving cell a cell different from the candidate cell.

7 Claims, 6 Drawing Sheets

(56) References Cited

U.S. PATENT DOCUMENTS

| | | | | |
|---|---|---|---|---|
| 2013/0301552 A1* | 11/2013 | Xu | H04B 7/0413 370/329 |
| 2018/0270738 A1* | 9/2018 | Martinez Tarradell | H04W 48/16 |
| 2022/0256416 A1* | 8/2022 | Sharma | H04W 48/20 |

FOREIGN PATENT DOCUMENTS

| | | | | |
|---|---|---|---|---|
| TW | 201831028 A | 8/2018 | | |
| WO | WO-2017140340 A1 | 8/2017 | | |
| WO | WO-2018210237 A1 | 11/2018 | | |
| WO | 2021/018652 A1 | 2/2021 | | |
| WO | WO-2022029064 A1 * | 2/2022 | H04W 36/0058 | |

OTHER PUBLICATIONS

Huawei et al., "Impact Analysis of NPN support", 3GPP TSG-RAN WG2 #105, R2-1901444, Feb. 25-Mar. 1, 2019, 3 pages.
Catt, "Traffic Steering of Solutions Without ANDSF", 3GPP TSG RAN WG2 Meeting #84, R2-133892, Nov. 11-15, 2013, 3 pages.
3GPP, "Study on Enhancement of 5G System (5GS) for Vertical and Local Area Network (LAN) Services (Release 16)", 3GPP TR 23.734, V16.2.0, Jun. 2019, 117 pages.
Intel Corporation, "Consideration on Slicing visibility to UE AS layer", 3GPP TSG RAN WG2 Meeting #97bis, R2-1703442, Apr. 3-7, 2017, 3 pages.
3GPP, "Radio Resource Control (RRC);Protocol Specification (Release 15)", 3GPP TS 25.331, V15.4.0, Sep. 2018, 2318 pages.
3GPP, "User Equipment (UE) Procedures in Idle Mode and Procedures for Cell Reselection in Connected Mode (Release 15)", 3GPP TS 25.304, V15.0.0, Jun. 2018, 58 pages.
3GPP, "System Architecture for the 5G System; Stage 2 (Release 16)", 3GPP TS 23.501, V16.2.0, Jul. 2019, 393 pages.
3GPP, "Service Requirements for the 5G System; Stage 1 (Release 16)", 3GPP TS 22.261 V16.7.0, Mar. 2019, 71 pages.
3GPP, "Numbering, Addressing and Identification (Release 15)", 3GPP TS 23.003 V15.6.0, Dec. 2018, pp. 1-130.
3GPP, "Non-Access-Stratum (NAS) Functions Related to Mobile Station (MS) in Idle Mode (Release 16)", 3GPP TS 23.122 V16.1.0, Mar. 2019, pp. 1-20.
3GPP, "System Architecture for the 5G System; Stage 2 (Release 16)", 3GPP TS 23.501 V16.0.0, Mar. 2019, pp. 1-318.
3GPP, "NR; NR and NG-RAN Overall Description; Stage 2 (Release 15)", 3GPP TS 38.300 V15.4.0, Dec. 2018, pp. 1-97.
Nokia et al., "Revised SID: Study on NR Industrial Internet of Things (Iot)", 3GPP TSG RAN meeting #81, RP-182090, Sep. 10-13, 2018, 5 pages.
3GPP, "Procedures for the 5G System; Stage 2 (Release 15)", 3GPP TS 23.502 v15.4.1, Jan. 2019, 23 pages.
3GPP, "NG-RAN; NG Application Protocol (NGAP) (Release 15)", 3GPP TS 38.413 V15.1.0, Sep. 2018, pp. 1-295.
3GPP, "NR; User Equipment (UE) Procedures in Idle mode and RRC Inactive State (Release 15)", 3GPP TS 38.304 V15.2.0, Dec. 2018, pp. 1-28.
3GPP TS 24.501 V16.0.2, Mar. 2019, pp. 1-480.
3GPP, "NR; Radio Resource Control (RRC) Protocol Specification (Release 15)", 3GPP TS 38.331 V15.6.0, Jun. 2019, pp. 1-519.
Holma et al., "LTE for UMTS OFDMA and SC-FDMA Based Radio Access", John Wiley & Sons, 2009, 232 pages.
ZTE Corporation et al: "Leftover issues for NW slicing", 3GPP Draft; R2-1800449, 3rd Generation Partnership Project (3GPP), Jan. 22, 2018-Jan. 26, 2018, XP051385729, Retrieved from the Internet: URL: http://www.3gpp.org/ftp/tsg%5Fran/WG2%5FRL2/TSGR2%5FAHs/2018%5F01 %5FNR/Docs/ [retrieved on Jan. 11, 2018].

* cited by examiner

COMMUNICATIONS DEVICE, INFRASTRUCTURE EQUIPMENT, CORE NETWORK ELEMENT AND METHODS

CROSS-REFERENCE TO RELATED APPLICATIONS

The present application is based on PCT/EP2020/069012 filed on Jul. 6, 2020, and claims priority to EP 19189361.9 filed on Jul. 31, 2019, the entire contents of each are incorporated herein by reference.

BACKGROUND

Field

The present disclosure relates to communications devices, infrastructure equipment and methods of supporting mobility of a communications device in a wireless communications network comprising a non-public network portion.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected that future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new Radio Access Technology (RAT) systems [1], as well as future iterations/releases of existing systems, to efficiently support connectivity for a wide range of devices associated with different applications and different characteristic data traffic profiles.

One aspect which may be considered for wireless communications networks and communications devices for 5G/NR technology is an arrangement in which the wireless communications network is divided into a public network part and a non-public network part. Access of the communications devices to the non-public network part may be restricted to certain types of communications devices or to a controlled group of communications devices. A technical challenge therefore arises in supporting mobility of communications devices between the different network parts.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Figure 1:
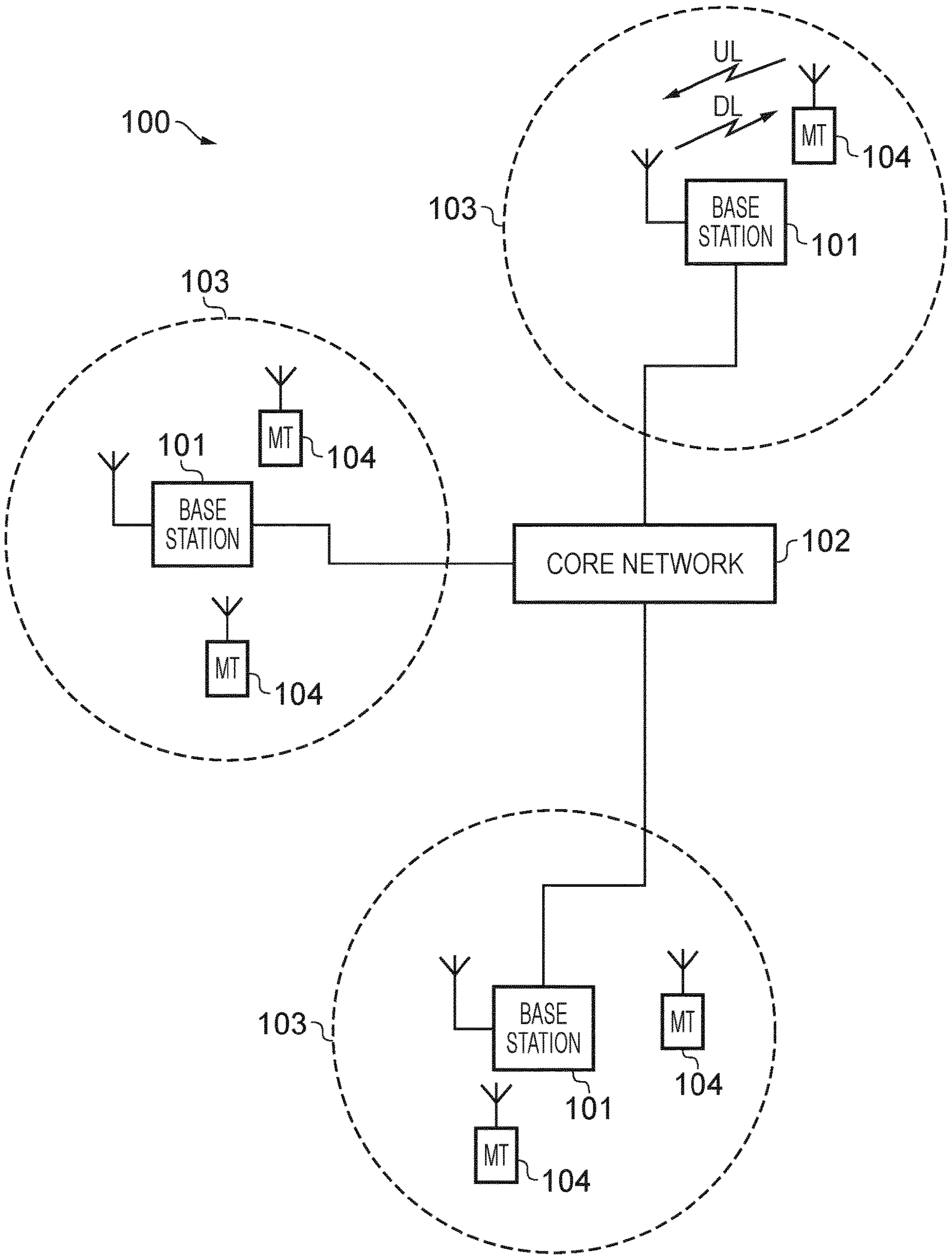
FIG. 1 schematically represents some aspects of an LTE-type wireless telecommunication system which may be configured to operate in accordance with certain embodiments of the present disclosure.

Long Term Evolution Advanced Radio Access Technology (4G) FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
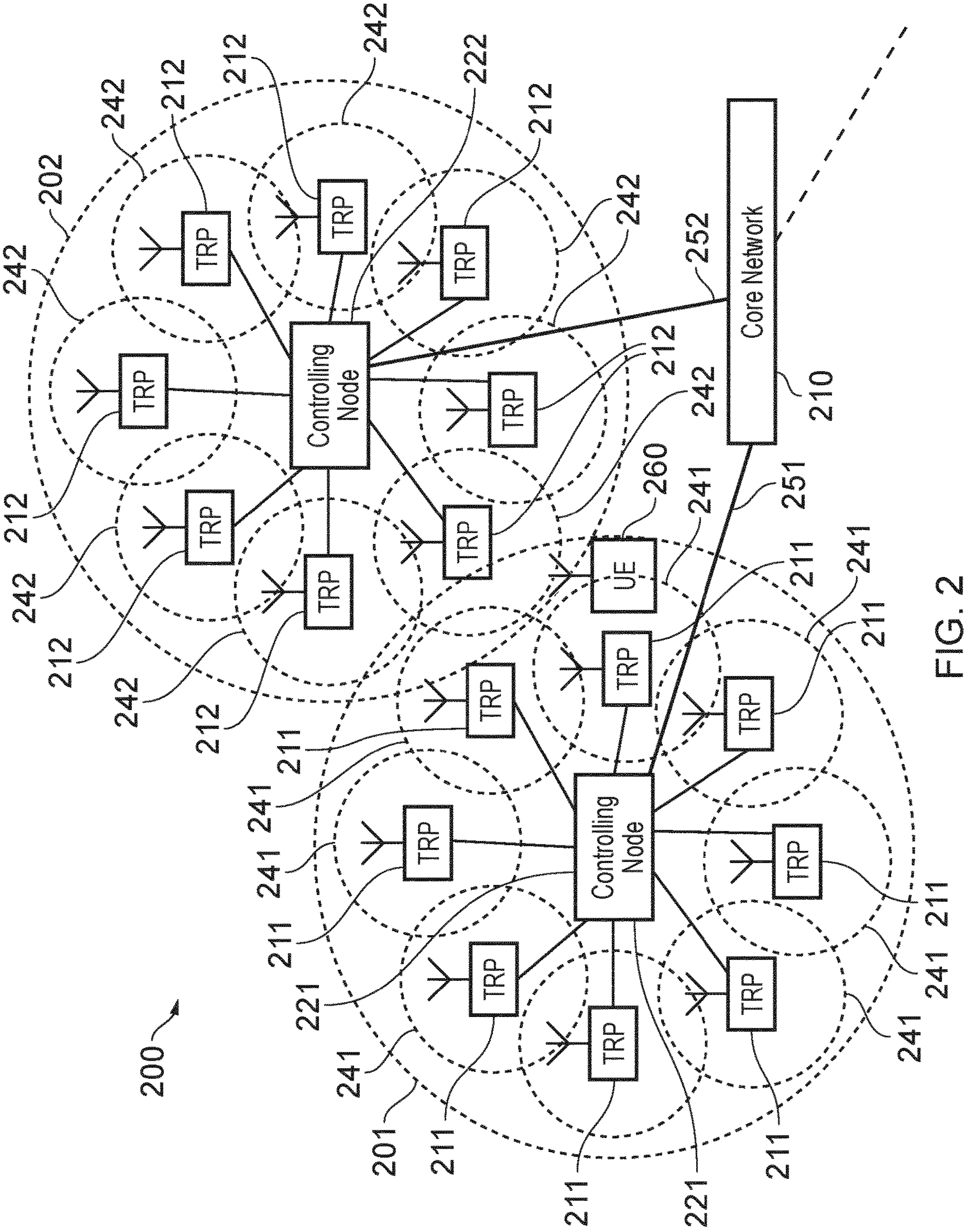
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new Radio Access Technology (RAT) wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communications cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated that the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/ access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
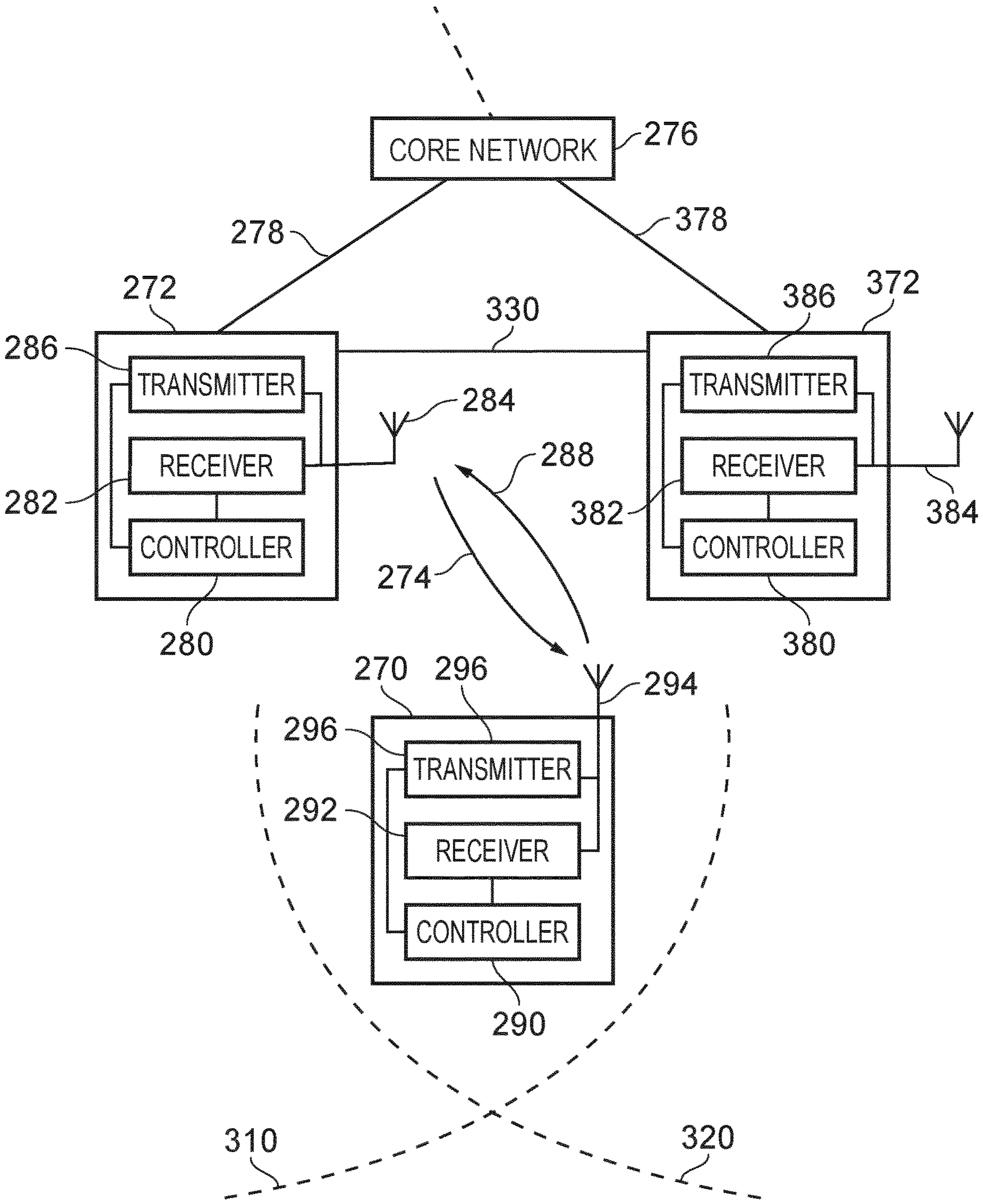
FIG. 3 is a schematic block diagram of example infrastructure equipment and communications device which may be configured in accordance with certain embodiments.

FIG. 3 illustrates schematically a UE/communications device 270 and example first and second network infrastructure equipment 272, 372. The communications device 270 may be thought of as an example of the communications device 104 of FIG. 1 or of the UE 260 of FIG. 2. Each of the first and second infrastructure equipment 272, 372, may be thought of as a gNB 101 or a combination of a controlling node 221 and TRP 211. Controllers 280, 380 of the infrastructure equipment 272, 372 are connected to a core network part 276 via respective interfaces 278, 378.

The first infrastructure equipment 272 includes a receiver 282 connected to an antenna 284 and a transmitter 286 connected to the antenna 284. Similarly, the second infrastructure equipment 372 includes a receiver 382 connected to an antenna 384 and a transmitter 386 connected to the antenna 384.

The controllers 280, 380 are configured to control the first and second infrastructure equipment 272, 372 respectively and may comprise processor circuitry which may in turn comprise various sub-units/sub-circuits for providing functionality as explained further herein. These sub-units may be implemented as discrete hardware elements or as appropriately configured functions of the processor circuitry. Thus the controllers 280, 380 may comprise circuitry which is suitably configured/programmed to provide the desired functionality using conventional programming/configuration techniques for equipment in wireless telecommunications systems. The transmitters 286, 386 and the receivers 282, 382 may comprise signal processing and radio frequency filters, amplifiers and circuitry in accordance with conventional arrangements. The transmitters 286, 386, the receivers 282, 382 and the controllers 280, 380 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272, 372 will in general comprise various other elements associated with its operating functionality.

Correspondingly, the UE 270 includes a controller 290 connected to a receiver 292 which receives signals from an antenna 294 and a transmitter 296 also connected to the antenna 294.

The controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity. In particular, for example, the communications device 270 may comprise, or be connected to secure hardware for storing subscription credentials and parameters on, within a subscriber identity module (SIM) or UMTS (Universal Mobile Telecommunications System) Subscriber Identity Module (USIM) application.

The controllers 280, 380, 290 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

The first and second infrastructure equipment 272, 372 may be connected directly to each other via an inter-infrastructure equipment interface 330, which, for example, may be operated broadly in accordance with conventional specifications for an X2 or Xn interface as specified by 3GPP.

The first infrastructure equipment 272 controls a first cell 310 in which the communications device 270 receives downlink data from the first infrastructure equipment 272 via resources of a wireless access interface as illustrated generally by an arrow 274, and transmits uplink data to the first infrastructure equipment 272 via resources of the wireless access interface as illustrated generally by an arrow 288.

The second infrastructure equipment 372 controls a second cell 320, which forms a part of a non public network, as will now be described.

Non Public Networks

Conventionally, a goal of operators of wireless communications networks has been to provide greatest geographical coverage and/or maximum performance for all its customers, while minimising expenditure on infrastructure equipment. Accordingly, it is generally preferable that each communications device using a wireless communications network obtains service in the most appropriate cell of those available. Restrictions by which a communications device is barred from selecting a particular cell were rarely used, other than for testing and/or other temporary operational reasons.

However, there has emerged a requirement to restrict certain cells to certain subscribers/communications devices. For example, an organisation may enter into an agreement with an operator of an existing wireless communications network, whereby the wireless communications network operator extends an existing network by deploying infrastructure equipment to generate new cells covering the organisation's premises. These cells may be restricted to communications devices associated with employees and/or equipment belonging to that organisation. These cells may be referred to as a 'non public network' (NPN), and access restrictions may apply to all communications devices, such that all communications device are permitted to access NPN cells only if they have the required permission(s).

As a result of such an arrangement, the organisation may ensure that communications devices under its control are ensured of having good coverage and/or good performance in a particular area. In particular, the NPN cells may cover indoor and/or underground spaces where conventional coverage is weak or non-existent.

Non Public Networks (NPN) are therefore networks which are deployed outside of a traditional mobile operator network. There are mainly two deployment options:

NPN deployed as a Standalone Non Public Network (SNPN)

NPN deployed as part of an operator's network as a Non-Standalone Non Public Network (NSNPN)

Where the cells form part of an existing public network, they may be referred to as a non-standalone NPN (NSNPN). Alternatively, infrastructure equipment and corresponding cells may form a 'standalone' network, separate from an existing network. Such a standalone network may be referred to as a 'standalone non public network (SNPN). SNPNs may be assigned one or more network identifiers for network selection. One network identifier may be, or be similar to a conventional Public Land Mobile Network (PLMN) identifier (ID). Another example of a network identifier may be an NPN identifier (NPN ID).

Accordingly, a communications device may be configured to operate in a mode where it selects only an SNPN based on the network identifier(s), in addition to a mode in which it performs conventional PLMN selection based on a PLMN ID (see [3], section 5.30.2).

NSNPN deployment may require that an NPN identifier (ID) providing a network identifier for network selection and a Closed Access Group (CAG) identifier (ID) are broadcast in a cell as well as a conventional PLMN ID, providing a further network identifier for network selection.

For NSNPN, it has been proposed that cells which are part of an NPN are associated with one or more closed access group (CAG) IDs, and that communications devices are provisioned or configured with a list of zero or more CAG IDs (a CAG list) depending on the NPN(s) which they are allowed to access.

The system information (for example, SIB1) of an NPN cell may include an indication of the cell's associated CAG ID(s). A communications device can evaluate whether or not it is permitted to access the cell by means of an access check based on parameters associated with the cell and the CAG list. For example if the cell's system information indicates that the cell is an NPN cell, but does not indicate any CAG ID which is in a list of allowed CAG IDs of the communications device, then the communications device cannot access the cell.

Communications devices which are permitted access to NPN cells (i.e. are configured with one or more allowed CAG IDs) may or may not be permitted to access cells which are not NPN cells. If a communications device is configured with permission to access only cells associated with one or more specific CAG IDs, then it will consider any cell which is not an NPN cell as not valid as a serving cell.

An NPN subscription may permit a UE to register and obtain service via the PN network as well.

Cell Reselection

Cell reselection generally refers to a process whereby the communications device changes its serving cell to a new cell, the new cell having been selected by the communications device.

Unlike a handover procedure, which is typically directed by a wireless communications network, cell reselection can occur while the communications device is in an idle or an INACTIVE mode, not having an active radio resource control (RRC) connection in the serving cell.

The process of cell reselection may be specified in standards specification, and may be in accordance with predetermined parameters configured by the wireless communications network.

Broadly, the key steps in the process of cell reselection may be summarised as follows:

1. The communications device makes measurements of signals received in the serving cell and/or of signals transmitted in other cells. These measurements may comprise measurements of signal strength and/or of signal quality (e.g. signal to noise+interference ratio). This step may be repeated periodically to determine whether conditions are satisfied which suggest that the current serving cell may soon be no longer suitable as a serving cell.
2. The communications device may be able to identify at this stage that a cell is not a candidate for reselection. For example, an identity parameter (such as a physical cell identifier) may be encoded within one or more synchronisation signals which the communications device knows corresponds to a not permitted cell based on, for example, a configuration by the serving wireless communications network.
3. If conditions for cell reselection relating to the signal strength measurements are satisfied in respect of a candidate cell, the communications device attempts to receive and decode broadcast system information relating to the cell.
4. The system information may provide additional parameters defining criteria which must be satisfied. These may be identity parameters (such as a public land mobile network (PLMN) ID), signal strength/quality parameters, and barring parameters. For example, in 3GPP Release 15 5G/NR, a master information block (MIB) may comprise a binary indicator cellBarred, which if set to 'barred', indicates that the communications device is not permitted to access the cell, and therefore cannot consider it as a candidate for cell reselection. Similarly, a system information block (SIB) 1 (conventionally decoded after the MIB) may comprise a boolean parameter cellReservedForOtherUse. If this parameter is set to 'true', then the communications device is required to treat the cell as barred (i.e. not permitted to be selected as a serving cell).
5. If, based on the information within the system information, all criteria for cell reselection are satisfied, then the communications device selects the candidate cell as its new serving cell. The communications device may transmit a notification in the new serving cell to notify the wireless communications network of its new serving cell, in order to ensure that downlink data and corresponding pages messages can be transmitted in the correct cell.
6. If, based on the information within the system information, all criteria for cell reselection are not satisfied, then the process may continue with step 3, in respect of another cells whose signal measurements satisfied the appropriate criteria.
7. If no candidate cell satisfies the criteria for cell reselection, then the current serving cell remains the serving cell.

Neighbour Cell Information

In order to assist the communications device in assessing only candidate cells which are permitted as serving cells for the communications device, the wireless communications network may transmit neighbour cell information.

For example, the wireless communications network may broadcast in system information of the current serving cell a list of frequencies on which permitted neighbour cells operate.

In accordance with conventional techniques, an infrastructure equipment may receive a mobility restriction list (MRL) (such as may be specified in [4]) from a core network entity, which is specific to a particular communications device and provides an indication of wireless communications networks (e.g. PLMNs), registration areas (e.g. tracking areas, identified by tracking area codes (TACs)) and radio access technologies which are either permitted or restricted for that communications device.

The infrastructure equipment may transmit measurement configuration information, based on the MRL, to the communications device in order to assist the communications device in selecting as candidate cells for reselection or handover, cells which are restricted according to the MRL.

Logical Network Portions

A wireless communications network may be arranged to support access to different 'logical portions' in order to enable flexible use of a radio access network (RAN) portion (whether part of an NPN portion or of a PN portion) and/or to allow services to be provided using a RAN by different commercial organisations. An example of a logical portion is a network slice. A wireless communications network may support multiple network slices, each appearing (to a communications device) to provide complete network functionality. Network slices may differ according to commercial arrangements (e.g. different network slices may be operated by, or on behalf of, different organisations), available services (e.g. a network slice may be provided solely for the purpose of machine type communications from smart meter devices, while another network slice may be for the support of vehicular communications), and technical capabilities (e.g. one slice may support low bandwidth, energy efficient data transmission, while another may support high bandwidth, low latency 'premium' data transmission for handheld devices and mobile broadband).

Physical equipment for supporting a network slice may be dedicated to that slice or may be shared between multiple slices. For example, authentication servers may be shared among multiple slices, while a user plane function may be dedicated to an individual slice. Slices may be realised by means of network function virtualization (NFV) and/or software-defined networking (SDN) techniques.

A network slice may be identified by a slice ID, which may be a Network Slice Selection Assistance Information (NSSAI). A network slice may be as defined in [3].

Access Point Names (APN) may also be considered to correspond to a logical portion of a wireless communications network. An APN may define a logical connection point in, or at an edge of, a wireless communications network provides access to a particular set of services and/or destinations. For example, one APN may provide internet protocol (IP) access to the internet, without restriction. Other APNs may provide access to services of a particular organisation, which may be the operator (or an operator) of the wireless communications network. For example, an APN may provide access to a company intranet, or to a messaging service provided by an operator.

Access to logical portions may be restricted by a subscription associated with a communications device. For example, a consumer subscription for a handheld device may permit access to an internet APN and a slice providing high bandwidth, low latency data transmissions. On the other hand, a business subscription may provide for a mobile broadband connection via an APN to an organisation's intranet to permit mobile workers to access data which is confidential to that organisation. Yet another subscription type may be for machine-to-machine smart meter devices, which allows access to a network slice providing low cost, low-bandwidth data transmissions, and to an APN providing access to the internal network of an energy distribution organisation.

The subscription information may be maintained in a subscriber identity module (SIM) which may be physically connected to, or embedded within a communications device. Within the wireless communications network, subscription information is maintained within the core network and is generally not directly accessible to the radio access network.

Different logical portions may be accessible via different cells; in particular an NPN cell may permit access to logical portions which are not accessible via geographically nearby PN cells, or vice versa.

When an NPN is hosted by a public network (NSNPN), the NPN could be implemented by realizing a dedicated network slice or APN (Access Point Name) for the NPN.

There is thus a need to provide solutions for supporting mobility between NPN and PN cells.

Embodiments can provide a method of selecting a cell in a wireless communications network by a communications device, the method comprising receiving system information associated with a candidate cell, the system information comprising a logical portion indication indicating one or more logical portion identities corresponding to respective logical portions of the wireless communications network which can be accessed in the candidate cell, determining that the candidate cell is a non-public cell to which access is restricted, determining that the communications device is not permitted to access any of the logical portions identified in the logical portion indication, and in response to determining that the communications device is not permitted to access any of the logical portions identified in the logical portion indication, selecting as a new serving cell a cell different from the candidate cell.

Embodiments of the present disclosure can allow mobility of a communications device to be controlled to ensure that cell reselection or selection, or network-controlled mobility (e.g. handover) is consistent with one or more subscriptions associated with the communications device and with the accessibility of logical portions of the wireless communications network, in particular when considering as a candidate cell a cell in an NPN portion of the wireless communications network in which access to logical portions of the network is restricted.

Figure 4:
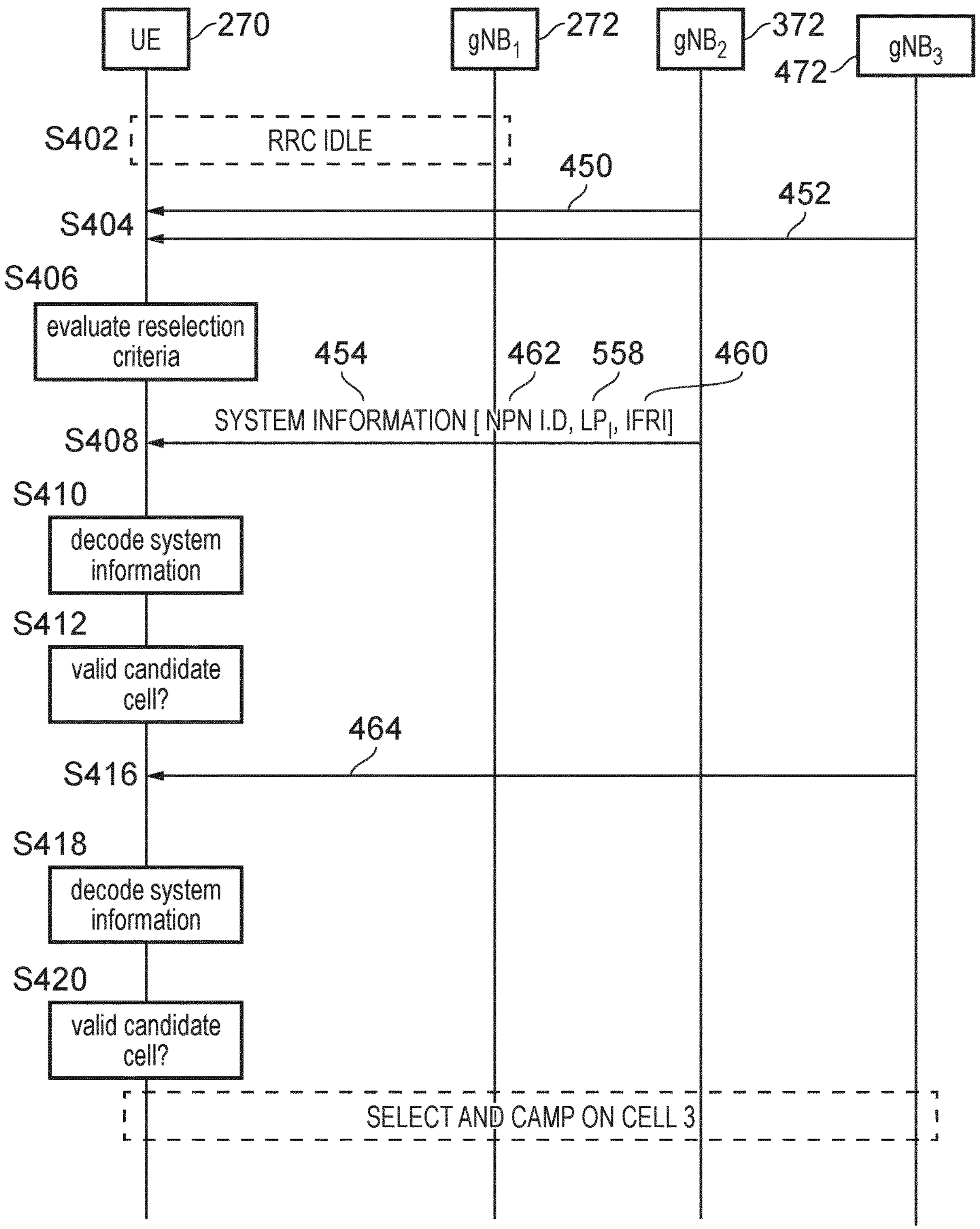
FIG. 4 is a message sequence chart for a process for cell reselection carried out by a communications device in accordance with embodiments of the present technique.

FIG. 4 illustrates a message sequence chart for a cell reselection process carried out by a communications device in accordance with embodiments of the present technique.

Initially at step S402, the communications device 270 is camped in the first cell 310 operating at a first frequency F1 and is in an idle or inactive mode, so that no data transmission or reception is currently ongoing.

The communications device 270 is configured with configured access permissions associated with non-public network cells, according to which the communications device 270 is restricted to certain cells. In particular, in embodiments of the present technique, according to the configured permissions, the communications device 270 is permitted to access only certain APNs and/or only certain network slices. In some embodiments, restrictions may be applicable only to (or may differ in respect of) NPN cells. The configured access permissions of the communications device 270 may be within, or may additionally comprise, a CAG list, which may contain a list of CAGs associated with NPN cells which the communications device 270 is permitted to access.

The configuration of the communications device 270 with the access permissions may be based on subscription parameters.

In step S404, the communications device 270 synchronises to, and performs measurements of, signals transmitted in other cells. In the example of FIG. 4, these signals comprise first signals 450 transmitted in the second cell 320 by the second infrastructure equipment 372 and second signals 452 transmitted in a third cell (not shown in FIG. 3) by a third infrastructure equipment 472. The first signals and second signals 450, 452 transmitted in the second cell 320 and the third cell may be on a second frequency, F2, different from the first frequency F1. The communications device 270 may also perform measurements of signals transmitted in the first cell 310 (not shown in FIG. 4).

The measurements made at step S404 may be of received signal strength and/or received signal quality.

At step S406, the communications device 270 evaluates predetermined cell reselection criteria. At step S406, the evaluation may be based only on radio-level measurements; that is, it may be without decoding any layer 2 or higher layer transmissions (such as broadcast system information referred to below) associated with the second or third cells.

The cell reselection criteria may comprise criteria configured by the first infrastructure equipment 272, preconfigured in the communications device 270 (e.g. based on standards specifications), or a mixture of the two.

In the example of FIG. 4, the communications device 270 determines that the reselection criteria are satisfied in respect of both the first and second signals 450, 452. Since these signals are transmitted using the same frequency, the communications device 270 performs a ranking and determines that the first signals 450 transmitted by the second infrastructure equipment 372 rank higher than those (second signals 452) transmitted by the third infrastructure equipment 472.

In response, the communications device 270 receives (at step S408) and decodes (at step S410) broadcast system information 454 transmitted by the second infrastructure equipment 372 associated with the second cell 320.

The broadcast system information 454 comprises an logical portion indication (LPI) 558 and may contain other indications, as will be described in further detail below.

At step S412, the communications device 270 determines whether it is permitted to access the second cell based on the broadcast system information and on its configured access permissions, as described below. In particular, the communications device 270 evaluates whether, according to its configured access permissions, it is permitted to access at least one logical portion of the wireless communications network which is (or may be) accessible via the second cell 320, as indicated in the broadcast system information 454.

In the example of FIG. 4, at step S412 the communications device 270 determines that it is not permitted to access the second cell 320.

In response, the communications device 270 selects another cell as a candidate cell for reselection.

In some embodiments, as in the example of FIG. 4 in respect of the third cell, this may comprise determining whether it is permitted to select a different cell which operates on the same frequency as the not permitted cell, but was ranked lower according to the cell reselection criteria. This may be based on the intra-frequency reselection indicator (IFRI) 460 within the broadcast system information 454.

In the example of FIG. 4, the IFRI 460 indicates that reselection to an intra-frequency cell (i.e. one operating on the same frequency as the second cell 320) is permitted, if the communications device 270 is not permitted to access a higher ranking cell.

Accordingly, the communications device 270 selects, based on the evaluation of received signals at step S406, the third cell as a candidate cell. Steps S408/S410/S412 are thus repeated, as steps S416, S418 and S420, in respect of broadcast system information 464 transmitted in the third cell by the third infrastructure equipment 472.

In the example of FIG. 4, the communications device 270 determines that it is permitted to access the third cell. This may be because, for example, the third cell is an NPN cell to which the communications device 270 is permitted access in accordance with its configured access parameters, or because the third cell is not an NPN cell.

In step S420, the communications device 270 selects the third cell as the new serving cell. The communications device 270 may attempt to establish an RRC connection (not shown) in the third cell with the third infrastructure equipment 472, for example to register with an appropriate core network entity.

Accordingly, the decision to reselect a new cell as a serving cell takes into account the access permissions of the communications device as well as the logical partitions of the wireless communications network which are accessible in a candidate cell, to avoid a communications device selecting, as a new serving cell, a cell in which it is not able to access any services.

System Information—Logical Portion Indication

The broadcast system information 454 associated with the second cell 230 which may be received in accordance with embodiments of the present technique by the communications device 270 in step S408 of the process of FIG. 4 will now be described.

The broadcast system information 454 may comprise a master information block (MIB) and one or more system information blocks (SIBs). The broadcast system information 454 may comprise an NPN indication 462 which indicates that the second cell 320 is an NPN cell.

The broadcast system information 454 may comprise an intra-frequency reselection indicator (IFRI) 460, which, as described above, may indicate whether the communications device 270 is permitted during a cell selection or reselection procedure to select as a further candidate cell a cell which operates on the same frequency as a rejected (not allowed) candidate cell.

In accordance with embodiments of the present technique, the broadcast system information 454 comprises a logical portion indication 556, which provides information about logical portions, such as APNs and network slices, which are (or are not) accessible in the second cell 320.

The logical portion indication 556 may in some embodiments contain only one APN ID and/or one slice identity. However, in some embodiments the logical portion indication 556 may contain any number of APN IDs and slice identities. A slice may be identified by an NSSAI.

The APN and/or slice identities may correspond to APNs and slices which are accessible in the second cell 320. In some embodiments, the indicated APNs and slices may be those which are not accessible in the second cell 320. In some embodiments, the logical portion indication may comprise an indication of APNs and/or slices and, for each indicated APN or slice, an indication of whether that APN or slice is accessible. Thus, the logical portion indication 556 conveys information about the accessibility via the second cell 320 of one or more logical portions, such as APNs and slices, of the wireless communications network.

From such a logical portion indication 556 (referred to herein as a 'full logical portion indication'), the communications device 270 can determine whether, for any logical portion (APN or slice) of interest, it is able to access that logical portion via the second cell 320, assuming no other restrictions prevent it from obtaining service in the second cell 320.

In some embodiments, the logical portion indication 556 may additionally or alternatively comprise a 'composite logical portion indication'. The composite logical portion indication may not permit the communications device 270 to determine whether, for any logical portion (APN or slice) of interest, it is able to access that logical portion via the second cell 320.

In some embodiments, the composite logical portion indication may comprise an indication that there is no restriction on the logical portions that are accessible in the second cell 320. Alternatively, the composite logical portion indication may comprise an indication that there is some restriction on the logical portions that are accessible in the second cell 320. For example, the composite logical portion indication may indicate one of the following:

- that there is no restriction on the accessibility to any APN or slice;
- that there is a restriction on the accessibility to one or more APN, and that there is no restriction on the accessibility to any slice;
- that there is a restriction on the accessibility to one or more slices, and that there is no restriction on the accessibility to any APN;
- that there is a restriction on the accessibility to one or more slices and to one or more APNs.

It will be appreciated that the composite logical portion indication may be encoded very compactly; for example, the four options enumerated above may be encoded within only 2 bits of information. In some embodiments, the composite logical portion indication may be included within the MIB, for allowing the communications device 270 to make a preliminary assessment as to the suitability of the second cell 320.

In some embodiments, component parts of the logical portion indication 556 may be transmitted in different ways. For example, in some embodiments, the logical portion indication 556 may comprise the composite logical portion indication (which may be transmitted within the MIB) and the full logical portion indication (which may be transmitted within a SIB). In other embodiments, only one of the full logical portion indication and the composite logical portion indication is transmitted.

In some embodiments, a part of the logical portion indication 556 may be transmitted in broadcast system information, and another part may be transmitted when the communications device 270 is in RRC connected mode. For example, a first part may comprise an indication of whether or not there is a restriction on the accessibility to one or more slices and to one or more APNs (i.e. which of the first or fourth of the above-enumerated options applies), the first part being transmitted by means of a single bit of information within the broadcast system information. A further part (which may provide specific details of accessible and/or prohibited APNs and/or slices) may be transmitted using an RRC connection. Accordingly, detailed information on which APNs and/or slices are accessible via a cell are transmitted in a secure manner. These examples of partitioning of the logical portion indication 556 are given as examples only and it will be appreciated that the logical portion indication 556 may be divided and transmitted other manners.

In the example of FIG. 4, the APN ID 456, slice ID 458, IFRI 460 and NPN indicator 462 are transmitted in broadcast system information 454 by the second infrastructure equipment 372 in the second cell 320. However, in some embodiments of the present disclosure, one or more of these indicators are received by the communications device 270 in other signalling. For example, in some embodiments, one or more of these indicators are transmitted in the serving (first) cell 310 by the first infrastructure equipment 272. In some embodiments, one or more of these indicators are transmitted in unicast signalling (such as via an RRC connection as described above) either in the first cell 310 or in the second cell 320 and stored for subsequent use by the communications device 270.

Evaluation of Access Permission by the Communications Device

In the process illustrated in FIG. 4, at steps S412, the communications device 270 determines whether it is permitted to access the second cell 320 based on the broadcast system information 454 and on its configured access permissions.

First, the communications device 270 may determine, for example based on the NPN indicator 462, that the second cell 320 is an NPN cell to which access restrictions apply in respect of all communications devices.

The communications device 270 may then determine whether it is permitted to access an NPN cell at all, or whether it is restricted to accessing only PN cells.

If the communications device 270 is not prohibited from all NPN cells, then the communications device 270 determines whether its configured access permissions for NPN cells permit it to access the second cell 320, based on at least the logical portion indication 558. Broadly, this may comprise determining if there is at least one APN and at least one network slice accessible via the second cell 320 to which the communications device 270 is permitted access, based on its configured access permissions.

For example, the logical portion indication 558 may comprise an indication that APNs "companyA.3gpp.org" and "companyZ.net", and a slice having an NSSAI=Z are accessible. The configured access permissions configured at the communications device 270 indicate that, in an NPN cell, the communications device 270 is permitted to access only the APN "companyJ.com". There being no APN accessible via the second cell 320 to which the communications device 270 is permitted access, the determination is made that the communications device 270 is not permitted to access the second cell 320.

In another example, the logical portion indication 558 may comprise an indication that there is no restriction on APNs which are accessible in the second cell 320 but that only network slices having an NSSAI=M or NSSAI=P are accessible. The configured access permissions configured at the communications device 270 indicate that, in an NPN cell, the communications device 270 is permitted to access only the APN "companyJ.com" and is permitted to access only the network slice having NSSAI=M. There being an APN ("companyJ.com") and a slice (NSSAI=M) which are both accessible via the second cell 320 and permitted for the communications device 270 in accordance with its configured access permissions, the determination is made that the communications device 270 is permitted to access the second cell 320.

Where the logical portion indication 556 comprises a composite logical portion indication, a determination based only on the composite logical portion indication may be sufficient to determine that the communications device 270 is (or is not) permitted access to the second cell 320.

For example, if the composite logical portion indication indicates that there is a restriction on the accessibility to one or more slices, but that there is no restriction on the accessibility to any APN, while the configured access permissions of the communications device 270 permits access to a limited set of APNs, but without any restriction regarding slices, then it can be determined that access to the second cell 320 is permitted.

Accordingly, in some embodiments where the MIB comprises the composite logical portion indication, the communications device 270 is able to determine that access is (or is not, as the case may be) permitted, without having to decode and read the full logical portion indication, which may be transmitted in a SIB.

On the other hand, the determination may be inconclusive if, for example, the configured access permissions restrict the communications device 270 to one or more specified APNs, and the composite logical portion indication indicates that some (unspecified) restriction applies to APN accessibility.

In some embodiments, if the determination is inconclusive, a further determination may be made based on the full logical portion indication, if this is also transmitted, for example in a SIB.

In some embodiments, additional determinations may be required based on the configured access permissions. For example CAG identities within the CAG list, PLMN IDs, NPN IDs and the like which indicate permissions or restrictions may be compared with corresponding identities indicated in the broadcast system information 454.

Accordingly, embodiments of the present technique provide for a determination as to whether the communications device 270 is permitted access to an NPN cell.

Measurement Reporting

In accordance with embodiments of the present technique, a neighbour cell measurement reporting process for reporting measurements of candidate cells comprises receiving a logical portion indication associated with a candidate NPN cell and generating a measurement report in respect of the candidate NPN cell, based on the logical portion indication.

In some embodiments, the communications device receives the logical portion indication in broadcast system information transmitted in the candidate NPN cell. The communications device may be in an RRC connected mode and configured with gaps for performing the reception of the broadcast system information, during which no data is transmitted or received by the communications device in a current serving cell.

In some embodiments of the present technique, a serving cell infrastructure equipment determines whether the communications device is permitted to access the candidate cell, in response to receiving a measurement report and based on an enhanced mobility restriction list received from a core network entity, the enhanced mobility restriction list comprising an indication of one or more logical portions that the communications device is permitted to access in an NPN cell.

Figure 5:
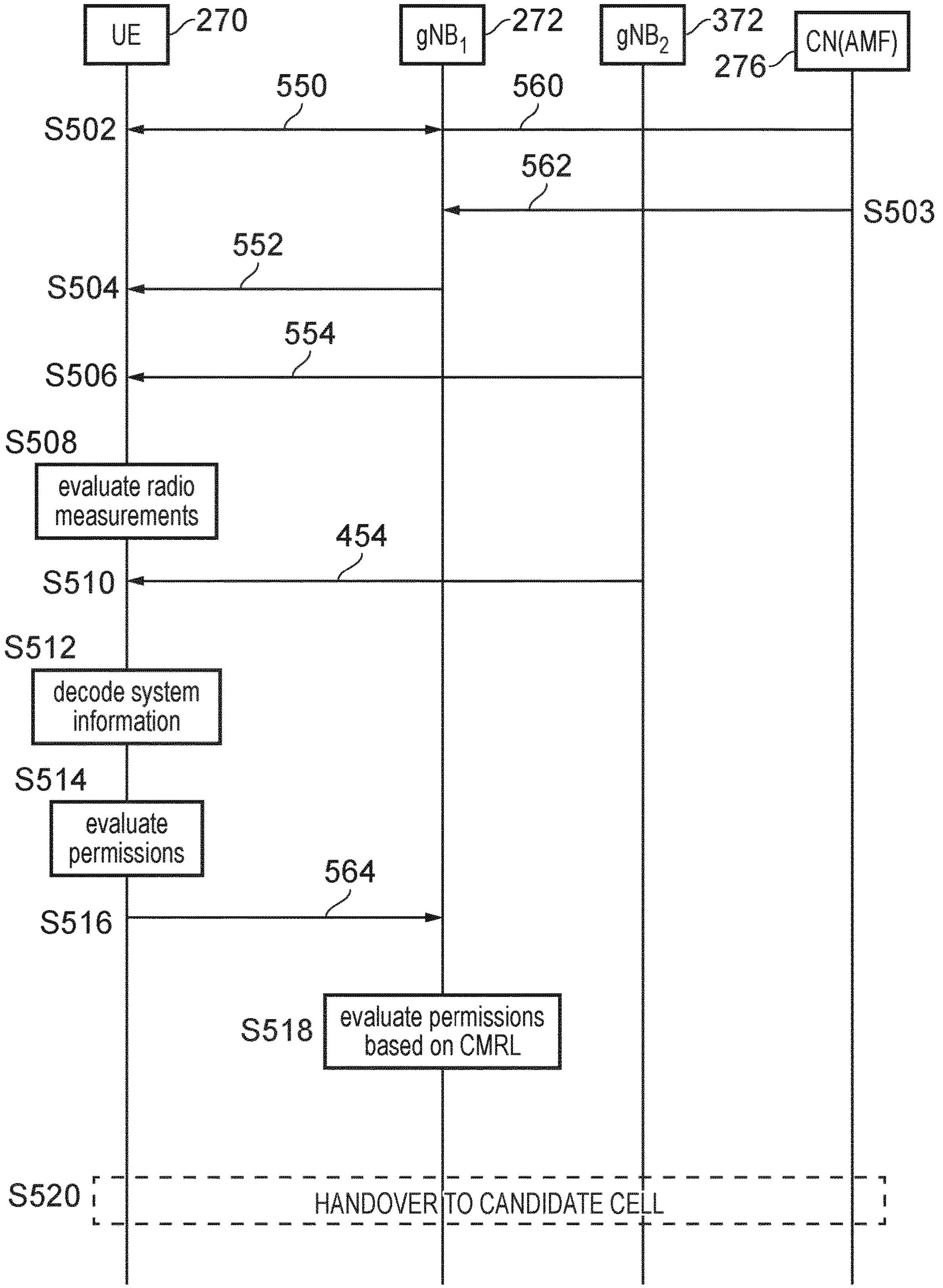
FIG. 5 is a message sequence chart for a process of reporting measurements of a neighbour cell, in accordance with embodiments of the present technique.

FIG. 5 illustrates a message sequence chart for a process of reporting measurements of a neighbour cell, in accordance with embodiments of the present technique.

Initially, as in the example of FIG. 4, the communications device 270 is configured with access permissions associated with NPN cells.

At step S502, the communications device 270 establishes an RRC connection 550 in the first cell 310 with the first infrastructure equipment 272 and may enter an RRC connected mode in which data transmission to and from the communications device 270 is possible.

The first infrastructure equipment 272 may transmit a registration indication 560 to the core network part, to indicate to the core network part 276 that the communications device 270 is being served by the first infrastructure equipment 272. The registration indication 560 may comprise a NAS message originating at the communications device 270.

In accordance with some embodiments of the present technique, at step S503 the core network part 276 transmits an enhanced mobility restriction list (eMRL) 562 for the communications device 270 to the first infrastructure equipment 272. The core network part 276 may be an access and mobility function (AMF).

The eMRL 562 may be transmitted in response to the registration indication 560, or may be transmitted during an initial context setup. The eMRL 562 comprises identities associated with NPN cells which the communications device 270 is permitted to access. For example, the eMRL 562 may contain one or more of a CAG ID, a PLMN ID, a slice ID (or NSSAI), an NPN ID and an APN ID, whereby the communications device 270 is not permitted to access an NPN cell (or a logical portion of the wireless communications network via the NPN cell) if that cell or portion has an identity not indicated as permitted by the eMRL 562.

Accordingly, shortcomings associated with a conventional MRL may be overcome. In particular, where NPN cells having different access restrictions are in close geographic proximity or overlap, a need to assign different registration area identifiers (e.g. tracking area codes (TACs)) to the different NPN cells can be avoided and different permissions for a same communications device can be more easily configured in respect of different cells having a same TAC.

It will be appreciated that permissions indications may be in the form of a blacklist (i.e. there is no permission in respect of identities listed), a whitelist (there is permission only in respect of identities listed) or a combination of the two.

At step S504, first infrastructure equipment 272 may transmit to the communications device 270 via the RRC connection 550 measurement configuration information 552 regarding neighbour cell measurements.

The measurement configuration information 552 may comprise indications of one or more of frequencies on which neighbour cells may be detected, measurement criteria, reporting criteria and the like. The measurement configuration information 552 may also indicate measurement periods (gaps) during which the communications device 270 may perform measurements while in connected mode and during which first infrastructure equipment 272 may refrain from transmitting downlink data to the communications device 270 or scheduling uplink transmissions by the communications device 270. The measurements configuration information 552 may also indicate system information receiving periods during which the communications device 270 may receive broadcast system information transmitted in a candidate neighbour cell when in the RRC connected mode.

Subsequently, the communications device may continue in RRC Connected mode (i.e. where the RRC connection 550 remains active and data transmission and reception is possible) or may enter an RRC Inactive mode in which the RRC connection 550 is suspended.

At step S506 the communications device 270 receives signals 554 on frequencies on which neighbour cells may transmit and measures the signals. For example, the communications device 270 may determine a signal strength, a signal quality or any other relevant measurement in respect of the received signals. If the communications device 270 is in RRC connected mode, step S506 may occur during a measurement gap.

At step S508 the communications device 270 determines if the measurement results obtained in step S506 in respect of signals transmitted in a candidate neighbour cell satisfy predetermined criteria, which may be based on criteria indicated in the measurements configuration information 552.

If (as in the example of FIG. 5) the predetermined criteria are satisfied, then at step S510 the communications device 270 receives and decodes the broadcast system information 454 transmitted in the candidate neighbour cell which is the second cell 230 formed by the second infrastructure equipment 372. Step S510 may occur during a configured system information receiving period, and/or may occur at a time determined based on a schedule for system information transmission in the second cell 230. For example the received signals 554 may comprise a synchronisation signal, based on which a time period during which the broadcast system information is transmitted may be determined.

At step S512 the communications device 270 decodes the received broadcast system information 454. The broadcast system information 454 may be substantially similar to that received at step S408 described above; in particular, the system information 454 may comprise the logical portion indication 556.

At step S514 the communications device 270 determines whether it is permitted to access the second cell 320. This step may be substantially the same as the determination at step S412 described above. In particular, in accordance with some embodiments of the present technique, at step S514 the communications device 270 identifies within the broadcast system information 556 the logical portion indication 558 and evaluates the received broadcast system information to determine whether it is permitted to access the candidate neighbour cell 320, based on at least the logical portion indication 558 and the configured access permissions. For example, the communications device 270 may determine whether it has permission to access at least one APN and/or at least one slice, via the second cell 320.

In some embodiments, at steps S510 and S512, only the MIB is received and decoded. If the MIB contains a composite logical portion indication from which it cannot be conclusively determined whether the communications device 270 is permitted to access an APN or a slice via the second cell 320, then steps S510 and S512 may be repeated in respect of one or more system information blocks, the one or more system information blocks comprising a full logical portion indications, and step S514 may be repeated based on the full logical portion indication.

In step S516, the communications device 270 transmits a measurement report 564 to the first infrastructure equipment 272 in the first cell 270. The measurement report 564 may be based on the measurement results evaluated at step S508 and, in some embodiments, on the evaluation at step S514.

In some embodiments, the measurement report 564 comprises an indication based on the logical portion indication 558 received in the broadcast system information 454. For example, the measurement report 564 may comprise one or more of an indication of the identity of the second cell 230, and the identities of any APNs or slices accessible via the second cell 230. In some embodiments, the measurement report 564 comprises a portion, or all, of the logical portion indication 558.

The measurement report 564 may additionally contain further parameters associated with the second cell 320, such as one or more of an NPN ID, a PLMN ID and a CAG ID, which may be determined by the communications device 270 based on the decoding of the broadcast system information 454 at step S512.

In some embodiments, the measurement report 564 comprises an indication of the outcome of the determination made at step S514 in respect of the second cell 320. That is, the measurement report 564 may comprise, for example, an indication of whether, based on the determination made at step S514, the communications device 270 is permitted to access the second cell 320. In some embodiments, the indication of the outcome of the determination at step S514 may be implicit. For example, the presence of any measurement results relating to the second cell 320 may implicitly indicate that the communications device 270 has determined that it is permitted to access the second cell 320.

At step S518, the first infrastructure equipment evaluates the measurement report 564.

In some embodiments, if the measurement report 564 comprised identities associated with the second cell 230, such as those of an APN, slice, CAG, and the like, then the first infrastructure equipment 272 determines whether, in accordance with the eMRL 562, the communications device 270 is permitted to access the second cell 230. In particular, the first infrastructure equipment 272 may determine whether a logical portion accessible in the second cell 230 (as indicated by the measurement report 564) is permitted for the communications device 270 in an NPN cell, according to the eMRL 562.

If at step S518 the first infrastructure equipment 272 determines that the communications device 270 is permitted to access the second cell 230, and determines that any other criteria for initiating a handover are satisfied, then the infrastructure equipment 272 may initiate a handover procedure at step S520. The handover procedure may be in accordance with any appropriate technique, including in accordance with one or more techniques disclosed in the co-pending application EP19188926.0 [7].

If at step S518 the first infrastructure equipment 272 determines that the communications device 270 is not permitted to access the second cell 230, or determines that any other criteria for initiating a handover are not satisfied, then the infrastructure equipment 272 may refrain from initiating a handover procedure.

The infrastructure equipment 272 may transmit further measurement configuration information 552, and the process may repeat from step S506.

The first infrastructure equipment 272 may determine that the communications device 270 is not permitted to access the second cell 230 based on the eMRL if, for example, the measurement report 564 comprises an indication that the second cell 230 permits access only to an APN which, according to the eMRL, the communications device 270 is not permitted to access.

Embodiments of the present technique in which the eMRL 562 is provided to the first infrastructure equipment 272 permit the first infrastructure equipment 272 to determine whether the communications device 270 is permitted to access a candidate cell.

In some embodiments, step S514 is omitted. That is, the measurement report 564 may be formed and transmitted irrespective of whether the communications device 270 is permitted to access the second cell 230.

In some embodiments, in response to receiving the measurement report 564 and performing the evaluation at step S518, the first infrastructure equipment 272 forms cell reselection information (not shown in FIG. 5) and transmits the cell reselection information to the communications device 270.

The cell reselection information may comprise a list of permitted and/or prohibited cells and may optionally also include reselection parameters (thresholds, and the like) for use by the communications device 270 in performing autonomous cell reselection. The list of permitted and/or prohibited cells preferably comprises an indication as to whether the communications device 270 is permitted to access the second cell 320.

As described above, the communications device 270 may not be permitted to perform cell reselection while in RRC CONNECTED mode, but may be permitted to perform cell reselection when in idle mode or in an INACTIVE mode. Accordingly, in response to receiving the cell reselection information, the communications device 270 may store the cell reselection information and may subsequently perform cell reselection in accordance with the cell reselection information. In particular for example, the communications device 270 may in some embodiments refrain from selecting an NPN cell which it is not permitted to access, based on the cell reselection information.

In some embodiments, the forming and transmission of the cell reselection information is performed in addition to the determination as to whether a handover should occur. In some embodiments, the forming and transmission of the cell reselection information is performed instead of the determination as to whether a handover should occur.

In some embodiments, the cell reselection information is formed taking into account the contents of the eMRL 562 received at step S503. That is, the list of permitted and/or prohibited cells is determined based on restrictions and/or permissions indicated in the eMRL 562, in particular in respect of NPN cells.

In some embodiments, the cell reselection information is formed and transmitted independent of (i.e. not in response to) the receipt of a measurement report, such as the measurement report 564. The cell reselection information may be formed and transmitted together with the measurement configuration information 552. Accordingly, in some embodiments, one or more steps including step S516 may be omitted.

In some cells, access to both PN and NPN services may be available. For example, it may be possible for a communications device 270 to register with a first AMF for PN services, and with a second AMF for NPN services.

This may be possible for example because the communications device 270 has two different subscriptions (e.g. two USIM applications) which can be simultaneously active. However, the inventors of the present disclosure have identified shortcomings with conventional mobility procedures in view of the above possibilities.

According to embodiments of the present technique, a communications device in a current serving cell may have two active registrations with one or two core network entities, each registration corresponding to a different subscription and accordingly to different permissions in respect of NPN cells. An infrastructure equipment providing the current serving cell receives for the communications device two mobility restriction lists, which in some embodiments may be enhanced mobility restriction lists (eMRLs), as described above.

Accordingly, a handover or reselection decision may be made taking into account different sets of restrictions applicable to NPN cells. The restrictions may be associated with (e.g. arising as a result of) two different subscriptions and may be notified to an infrastructure equipment by two different core network entities. In particular, the restrictions may related to APNs and/or slices which the communications device is permitted to access in NPN cells.

Figure 6:
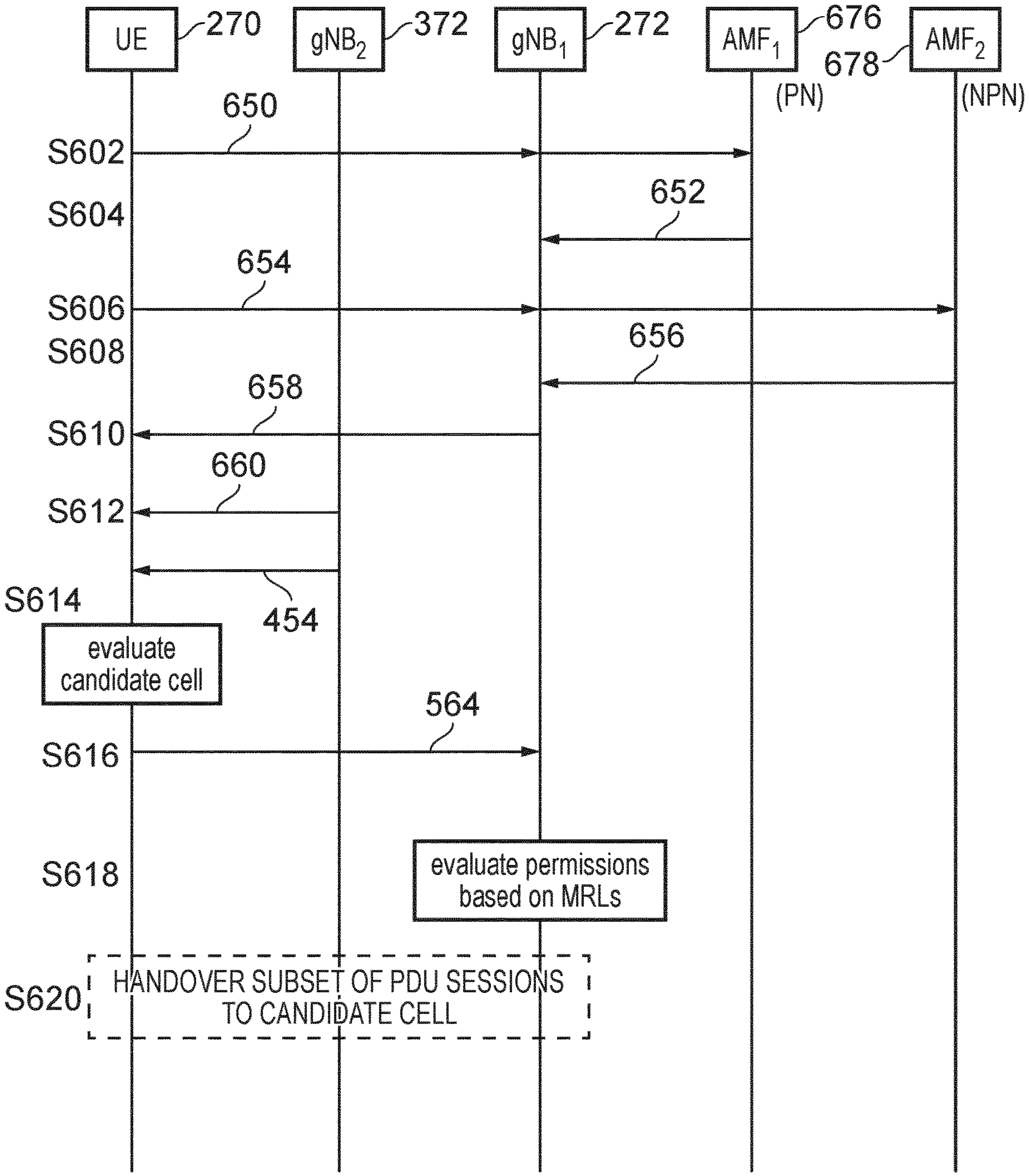
FIG. 6 shows a message sequence chart for receiving multiple mobility restriction lists associated with a single communications device by an infrastructure equipment in accordance with embodiments of the present technique.

FIG. 6 shows a message sequence chart for receiving multiple mobility restriction lists associated with a single communications device by an infrastructure equipment in accordance with embodiments of the present technique.

It is assumed at the start of the process that the communications device 270 has selected the first cell 310 as a serving cell, and has established an RRC connection with the first infrastructure equipment 272.

At step S602, the communications device 270 transmits a first registration request 650 in the first cell 310 to the first infrastructure equipment 272. The first registration request 650 is associated with a first subscription of the communications device 270. For example, the first registration request 650 is associated with a first subscriber identity module (SIM) application of the communications device 270. The first registration request 650 is forwarded by the first infrastructure equipment 272 to a first AMF 676. The first subscription may be for accessing PN services, and accordingly the first AMF 676 may be associated with a PN portion of the wireless communications network for providing PN services.

A registration procedure may then follow (not shown in FIG. 6).

At step S604, after receiving the first registration request 650, the first AMF 678 transmits a first MRL 652 to the first infrastructure equipment 272.

Similarly, at steps S606 and S608, the communications device 270 transmits a second registration request 654 associated with a second subscription to the first infrastructure equipment 272, which forwards the second registration request 654 to a second AMF 678. The second subscription may be for accessing NPN services, and the second AMF 678 may be associated with an NPN portion of the wireless communications network for providing NPN services. After receiving the second registration request 654, the second AMF 678 transmits a second MRL 656 to the first infrastructure equipment 272.

In some embodiments, one or both of the first and second MRLs 652, 656 are eMRLs as described above.

At step S610, the infrastructure equipment 272 transmits measurement configuration information 658, which may be broadly similar to the measurement configuration information 552 described above. In some embodiments, the measurement configuration information 658 is formed taking into account both the first and second MRLs 652, 656. For example, the first infrastructure equipment 272 may determine that certain cells are not accessible to the communications device 270 based on their being NPN cells providing access to only certain logical portions of the wireless communications network. Accordingly, the measurement configuration information 658 may comprise an indication of physical cell identities associated with those cells which are not to be considered as candidate cells for measurements by the communications device 270.

Subsequently in step S612, the communications device 270 performs measurements of downlink transmissions 660 transmitted in the second cell 230 by the second infrastructure equipment 372, and receives and decodes broadcast system information 662 transmitted in the second cell 230. In step S614 the communications device 270 may evaluate the received broadcast system information 662, and at step S616 the communications device 270 transmits a measurement report 664 to the first infrastructure equipment 272.

Steps S612, S614 and S616 may correspond substantially to the corresponding steps (S506-S516) described above in respect of the process illustrated in FIG. 5, and it will be appreciated that some intermediate steps and details are omitted in FIG. 6 for conciseness. For example, the communications device 270 may decode broadcast system information 662 only after determining that measurements results associated with the second cell 320 satisfy predetermined requirements.

The measurement report 664 may comprise an indication of measurement results associated with the second cell 320 and may further comprise identities associated with the second cell 320, such as one or more of a CAG ID, NPN ID, slice ID and APN ID, as described above in respect of step S516.

In some embodiments, at step S618, the first infrastructure equipment determines whether or not, based on the measurement report 664, the communications device 270 is permitted to access the second cell 320. This determination may correspond to the determination in step S518 of the process illustrated in FIG. 5 and described above. Unlike the process of FIG. 5, however, in step S618 in the process of FIG. 6 the infrastructure equipment 270 assesses the accessibility of the second cell 320 based on a plurality of (e.g. two) MRLs received from the first and second AMFs 676, 678.

Based on assessing the accessibility of a cell in respect of different MRLs in step S618, there may be one of three outcomes: i) the cell is accessible according to both/all MRLs ii) the cell is not accessible according to both/all MRLs, and iii) the cell is accessible according to one (or more) MRLs, but not accessible according to one (or more) other MRLs.

In some embodiments, in response to determining that the first option (i) is applicable, the infrastructure equipment 270 considers that the handover may proceed. In response to determining that the second option (ii) is applicable, the infrastructure equipment 270 determines that a handover cannot proceed to the second cell 320.

In some embodiments, if the infrastructure equipment 270 determines that, according to at least one MRL associated with the communications device, the second cell 320 is not accessible to the communications device, then the infrastructure equipment 270 determines that a handover cannot proceed to the second cell 320.

In some embodiments, if the infrastructure equipment 270 determines that, according to at least one MRL associated with the communications device, the second cell 320 is accessible to the communications device, while according to at least one other MRL associated with the communications device, the second cell 320 not accessible (i.e. option (iii) above), then the infrastructure equipment 270 determines that a handover to the second cell 320 may occur to a limited extent. For example, the handover may occur only in respect of connections (e.g. PDU sessions or Ni connections) which have been established in accordance with a subscription (and hence a respective MRL) according to which the communications device 270 is permitted to access the second cell 320.

In the example of FIG. 6, it is determined at step S618 that according to the first MRL 652 (which is an eMRL comprising an indication of permitted logical portions), the communications device 270 is not permitted to access any logical portion (slice, APN) which is accessible in the second cell 320. However, it is determined that at least one logical portion is both permitted according to the second MRL 656 and accessible in the second cell 320. Accordingly, at step S620, the first infrastructure equipment 272 initiates a handover to the second cell 320 in respect of a PDU session established in accordance with the second subscription.

In some embodiments, any PDU sessions associated with a subscription, according to which access in the second cell 320 is not permitted, are implicitly or explicitly released as part of the handover procedure at step S620.

In some embodiments, the communications device 270 may have different subscriptions whose associated registration messages 650, 654 are received at the same AMF. This may be because, for example, a single AMF handles both PN and NPN services within the wireless communications network. In such scenarios, the first infrastructure equipment 272 may receive the first and second MRLs 652, 656 from the same AMF.

In some embodiments, the communications device 270 is permitted to register for both PN and NPN services in accordance with a same subscription. Accordingly, the communications device 270 may perform two or more registrations (one or more for PN services, and one or more for NPN services) which may be with the same or different core network entities. Accordingly, the first infrastructure equipment 272 may receive multiple MRLs in respect of the same communications device 270. The techniques disclosed above may, in accordance with embodiments of the present technique, be applied in such a scenario.

In some embodiments, where the communications device 270 is registered at the same time for PN and NPN services with the same core network entity, the core network entity determines that the registrations are in respect of the same communications device, and forms a consolidated MRL, which is consistent with the subscriptions corresponding to the simultaneous registrations. Accordingly, the first infrastructure equipment 272 may receive a single MRL in respect of the same communications device 270.

In some embodiments within the scope of the present disclosure, one or more examples described herein may be adapted, modified, or combined. In particular, in some embodiments, one or more of the process steps described herein may be omitted, or performed in a different order. For example, in the process illustrated in FIG. 5, step S504 may be omitted and/or replaced with the transmission of cell reselection information.

Embodiments can therefore provide a method of selecting a cell in a wireless communications network by a communications device, the method comprising receiving system information associated with a candidate cell, the system information comprising a logical portion indication indicating one or more logical portion identities corresponding to respective logical portions of the wireless communications network which can be accessed in the candidate cell, determining that the candidate cell is a non-public cell to which access is restricted, determining that the communications device is not permitted to access any of the logical portions identified in the logical portion indication, and in response to determining that the communications device is not permitted to access any of the logical portions identified in the logical portion indication, selecting as a new serving cell a cell different from the candidate cell.

Embodiments can further provide a method of reporting measurements of a neighbour cell in a wireless communications network by a communications device, the wireless communications network comprising an infrastructure equipment providing a wireless access interface in a serving cell, the method comprising measuring downlink signals transmitted in the neighbour cell, the neighbour cell forming part of a non-public network portion of the wireless communications network, receiving system information associated with the neighbour cell, the system information comprising a logical portion indication indicating one or more logical portion identities corresponding to respective logical portions of the wireless communications network which can be accessed in the candidate cell, based on the logical portion indication and the result of the measuring, generating a measurement report in respect of the neighbour cell, and transmitting to the infrastructure equipment the measurement report.

Embodiments can further provide a method of operating an infrastructure equipment in a wireless communications network, the wireless communications network comprising a public network portion and a non-public network portion, the infrastructure equipment providing a wireless access interface for communicating with a communications device and a core network entity, the method comprising receiving from the core network entity an enhanced mobility restriction list, the enhanced mobility restriction list comprising an indication of one or more logical portions of the wireless communications network which the communications device is permitted to access via the non-public network portion, receiving from the communications device a measurement report comprising an indication of a candidate cell in the non-public network portion and an indication of one or more logical portions accessible via the candidate cell, determining, based on the measurement report and the enhanced mobility restriction list, that the communications device is permitted to access at least one logical portion of the wireless communications network via the candidate cell, and in response to the determining, initiating a handover of the communications device to the candidate cell.

Embodiments can further provide a method of operating an infrastructure equipment in a wireless communications network, the wireless communications network comprising a public network portion and a non-public network portion, the infrastructure equipment providing a wireless access interface for communicating with a communications device and a core network entity, the method comprising receiving from the core network entity an enhanced mobility restriction list, the enhanced mobility restriction list comprising an indication of one or more logical portions of the wireless communications network which the communications device is permitted to access via the non-public network portion, determining, based on the enhanced mobility restriction list, that the communications device is permitted to perform autonomous cell reselection to a candidate cell, in response to the determining that the communications device is permitted to perform autonomous cell reselection to the candidate cell, forming cell reselection information indicating that the communications device is permitted to perform autonomous cell reselection to the candidate cell, and transmitting the cell reselection information to the communications device.

Embodiments can further provide a method of operating a core network entity in a wireless communications network, the wireless communications network having a public network portion and a non-public network portion and comprising the core network entity and an infrastructure equipment providing a wireless access interface for communicating with a communications device, the method comprising receiving a registration request from the infrastructure equipment, the registration request associated with a subscription associated with the communications device, based on the subscription, determining one or more logical portions of the wireless communications network to which the communications device is permitted access via the non-public network portion, and transmitting to the infrastructure equipment an enhanced mobility restriction list, the enhanced mobility restriction list comprising an indication of the one or more logical portions of the wireless communications network which the communications device is permitted to access via the non-public network portion.

Corresponding infrastructure equipment, communications devices and core network entities and circuitry, and computer readable media are also provided by embodiments of the present disclosure.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches can be applied in respect of any type communications device operating with a wireless link to the communication network.

It will further be appreciated that the principles described herein are not applicable only to LTE-based wireless telecommunications systems, but are applicable for any type of wireless telecommunications system having a non-public network portion to which access is restricted.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of selecting a cell in a wireless communications network by a communications device, the method comprising receiving system information associated with a candidate cell, the system information comprising a logical portion indication indicating one or more logical portion identities corresponding to respective logical portions of the wireless communications network which can be accessed in the candidate cell, determining that the candidate cell is a non-public cell to which access is restricted, determining that the communications device is not permitted to access any of the logical portions identified in the logical portion indication, and in response to determining that the communications device is not permitted to access any of the logical portions identified in the logical portion indication, selecting as a new serving cell a cell different from the candidate cell.

Paragraph 2. A method according to paragraph 1, wherein one or more of the logical portion identities is an access point name.

Paragraph 3. A method according to paragraph 1 or paragraph 2, wherein one or more of the logical portion identities is a slice identifier.

Paragraph 4. A method according to any of paragraphs 1 to 3, wherein the candidate cell is characterised by a first carrier frequency, the system information comprises an intra-frequency reselection indicator indicating that, in the event that the communications device candidate cell is not permitted to access the candidate cell, the communications device is permitted to select as a new serving cell another cell operating at the first carrier frequency, and the selected different cell is characterised by the first carrier frequency.

Paragraph 5. A method according to any of paragraphs 1 to 4, the method comprising receiving, in a serving cell from a serving infrastructure equipment of the wireless communications network, cell reselection information comprising an indication of one or more non-public network cells which the communications device is not permitted to access.

Paragraph 6. A method according to paragraph 5, wherein the cell reselection information is formed by the serving infrastructure equipment in accordance with an enhanced mobility restriction list comprising an indication of one or more logical portions of the wireless communications network which the communications device is permitted to access received by the serving infrastructure equipment.

Paragraph 7. A method according to paragraph 5 or paragraph 6, wherein the receiving the cell reselection information occurs while the communications device is in a connected mode in which data can be transmitted to or by the communications device in the serving cell.

Paragraph 8. A method according to any of paragraphs 1 to 7, wherein the selecting as the new serving cell the cell different from the candidate cell is performed while the communications device is in an inactive mode in which a radio connection with the serving cell is suspended.

Paragraph 9. A method of reporting measurements of a neighbour cell in a wireless communications network by a communications device, the wireless communications network comprising an infrastructure equipment providing a wireless access interface in a serving cell, the method comprising measuring downlink signals transmitted in the neighbour cell, the neighbour cell forming part of a non-public network portion of the wireless communications network, receiving system information associated with the neighbour cell, the system information comprising a logical portion indication indicating one or more logical portion identities corresponding to respective logical portions of the wireless communications network which can be accessed in the candidate cell, based on the logical portion indication and the result of the measuring, generating a measurement report in respect of the neighbour cell, and transmitting to the infrastructure equipment the measurement report.

Paragraph 10. A method according to paragraph 9, the method comprising determining, based on the logical portion indication, that the communications device is permitted to access at least one logical portion of the wireless communications network via the neighbour cell, wherein the measurement report comprises a membership indication indicating that the communications device is permitted to access the neighbour cell.

Paragraph 11. A method according to paragraph 9 or paragraph 10, wherein the communications device is in a connected mode in the serving cell, the method comprising determining time periods during which the system information is broadcast in the neighbour cell, wherein receiving the system information associated with the neighbour cell comprises receiving, during one of the determined time periods, the system information transmitted in the neighbour cell.

Paragraph 12. A method according to any of paragraphs 9 to 11, wherein generating the measurement report in respect of the neighbour cell comprises including within the measurement report an indication of one or more logical portions of the wireless communications network which are accessible in the neighbour cell.

Paragraph 13. A method of operating an infrastructure equipment in a wireless communications network, the wireless communications network comprising a public network portion and a non-public network portion, the infrastructure equipment providing a wireless access interface for communicating with a communications device and a core network entity, the method comprising receiving from the core network entity an enhanced mobility restriction list, the enhanced mobility restriction list comprising an indication of one or more logical portions of the wireless communications network which the communications device is permitted to access via the non-public network portion, receiving from the communications device a measurement report comprising an indication of a candidate cell in the non-public network portion and an indication of one or more logical portions accessible via the candidate cell, determining, based on the measurement report and the enhanced mobility restriction list, that the communications device is permitted to access at least one logical portion of the wireless communications network via the candidate cell, and in response to the determining, initiating a handover of the communications device to the candidate cell.

Paragraph 14. A method according to paragraph 13, the method comprising in response to receiving the enhanced mobility restriction list, generating measurement configuration information based on the one or more logical portions indicated in the enhanced mobility restriction list, the measurement configuration indication indicating physical parameters associated with cells which are not to be considered as candidate cells for measurements by the communications device, and transmitting the measurement configuration information to the communications device.

Paragraph 15. A method according to paragraph 13 or paragraph 14, the method comprising in response to the determining, based on the measurement report and the enhanced mobility restriction list, that the communications device is permitted to access at least one logical portion of the wireless communications network via the candidate cell, forming cell reselection information indicating that the communications device is permitted to perform autonomous cell reselection to the candidate cell, and transmitting the cell reselection information to the communications device.

Paragraph 16. A method according to any of paragraphs 13 to 15, wherein the enhanced mobility restriction list is associated with a first subscription of the communications device, the method comprising receiving from a second core network entity a second enhanced mobility restriction list, the second enhanced mobility restriction list comprising an indication of one or more logical portions of the wireless communications network which the communications device is permitted to access via the non-public network portion in accordance with a second subscription of the communications device.

Paragraph 17. A method according to paragraph 16, the method comprising determining, based on the measurement report and the second enhanced mobility restriction list, that the communications device is not permitted to access at least one logical portion of the wireless communications network via the candidate cell in accordance with the second subscription, and in response to the determining, initiating the handover of the communications device to the candidate cell in respect of only a protocol data unit (PDU) session established in accordance with the first subscription.

Paragraph 18. A method according to paragraph 16 or paragraph 17, wherein the core network entity and the second core network entity are the same core network entity.

Paragraph 19. A method of operating an infrastructure equipment in a wireless communications network, the wireless communications network comprising a public network portion and a non-public network portion, the infrastructure equipment providing a wireless access interface for communicating with a communications device and a core network entity, the method comprising receiving from the core network entity an enhanced mobility restriction list, the enhanced mobility restriction list comprising an indication of one or more logical portions of the wireless communications network which the communications device is permitted to access via the non-public network portion, determining, based on the enhanced mobility restriction list, that the communications device is permitted to perform autonomous cell reselection to a candidate cell, in response to the determining that the communications device is permitted to perform autonomous cell reselection to the candidate cell, forming cell reselection information indicating that the communications device is permitted to perform autonomous cell reselection to the candidate cell, and transmitting the cell reselection information to the communications device.

Paragraph 20. A method according paragraph 19, wherein the enhanced mobility restriction list is associated with a first subscription of the communications device, the method comprising receiving from a second core network entity a second enhanced mobility restriction list, the second enhanced mobility restriction list comprising an indication of one or more logical portions of the wireless communications network which the communications device is permitted to access via the non-public network portion in accordance with a second subscription of the communications device, wherein the determining that the communications device is permitted to perform autonomous cell reselection to the candidate cell is based on the second enhanced mobility restriction list.

Paragraph 21. A method according to any of paragraphs 13 to 20, wherein the enhanced mobility restriction list comprises an indication of one or more closed access groups of which the communications device is a member.

Paragraph 22. A method according to any of paragraphs 13 to 21, wherein the enhanced mobility restriction list comprises an indication of one or more network identifiers each associated with a network which the communications device is permitted to access.

Paragraph 23. A method according to paragraph 22, wherein each of the one or more the network identifiers is for identifying and selecting a standalone non public network or a non-standalone non public network from a plurality of networks.

Paragraph 24. A method according to any of paragraphs 13 to 23, wherein the indication of one or more logical portions of the wireless communications network comprises one or more of an access point name and an identifier of a network slice.

Paragraph 25. A method of operating a core network entity in a wireless communications network, the wireless communications network having a public network portion and a non-public network portion and comprising the core network entity and an infrastructure equipment providing a wireless access interface for communicating with a communications device, the method comprising receiving a registration request from the infrastructure equipment, the registration request associated with a subscription associated with the communications device, based on the subscription, determining one or more logical portions of the wireless communications network to which the communications device is permitted access via the non-public network portion, and transmitting to the infrastructure equipment an enhanced mobility restriction list, the enhanced mobility restriction list comprising an indication of the one or more logical portions of the wireless communications network which the communications device is permitted to access via the non-public network portion.

Paragraph 26. A method according to paragraph 25, wherein according to the subscription, the logical portions of the wireless communications network which the communications device is permitted access via the non-public network portion differ from one or more logical portions of the wireless communications network which the communications device is permitted access via the public network portion.

Paragraph 27. A method according to any of paragraph 25 or paragraph 26, wherein the enhanced mobility restriction list comprises an indication of one or more closed access groups of which the communications device is a member.

Paragraph 28. A method according to any of paragraphs 25 to 27, wherein the enhanced mobility restriction list comprises one or more of: an indication of a network identifier associated with a network which the communications device is permitted to access, and an indication of a logical portion of a wireless communications network which the communications device is permitted to access.

Paragraph 29. A method according to paragraph 28, wherein the network identifier is for identifying a standalone non public network or a non-standalone non public network.

Paragraph 30. A method according to paragraph 28 or paragraph 29, wherein the indication of a logical portion of the wireless communication is one of an access point name and an identifier of a network slice.

Paragraph 31. A communications device for operating in a wireless communications network, the communications device comprising a transmitter configured to transmit signals via a wireless access interface provided by an infrastructure equipment of the wireless communications network, the wireless communications network comprising the infrastructure equipment providing the wireless access interface in a cell, a receiver configured to receive signals via the wireless access interface, and a controller configured to control the transmitter and the receiver so that the communications device is operable: to receive system information associated with a candidate cell, the system information comprising a logical portion indication indicating one or more logical portion identities corresponding to respective logical portions of the wireless communications network which can be accessed in the candidate cell, to determine that the candidate cell is a non-public cell to which access is restricted, to determine that the communications device is not permitted to access any of the logical portions identified in the logical portion indication, and in response to determining that the communications device is not permitted to access any of the logical portions identified in the logical portion indication, to select as a new serving cell a cell different from the candidate cell.

Paragraph 32. Circuitry for a communications device for operating in a wireless communications network, the circuitry comprising transmitter circuitry configured to transmit signals via a wireless access interface provided by an infrastructure equipment of the wireless communications network, the wireless communications network comprising the infrastructure equipment providing the wireless access interface in a cell, receiver circuitry configured to receive signals via the wireless access interface, and controller circuitry configured to control the transmitter circuitry and the receiver circuitry so that the communications device is operable: to receive system information associated with a candidate cell, the system information comprising a logical portion indication indicating one or more logical portion identities corresponding to respective logical portions of the wireless communications network which can be accessed in the candidate cell, to determine that the candidate cell is a non-public cell to which access is restricted, to determine that the communications device is not permitted to access any of the logical portions identified in the logical portion indication, and in response to determining that the communications device is not permitted to access any of the logical portions identified in the logical portion indication, to select as a new serving cell a cell different from the candidate cell.

Paragraph 33. A communications device for operating in a wireless communications network, the communications device comprising a transmitter configured to transmit signals via a wireless access interface provided by an infrastructure equipment of the wireless communications network, the wireless communications network comprising a non-public network portion and an infrastructure equipment providing a wireless access interface in a serving cell, a receiver configured to receive signals via the wireless access interface, and a controller configured to control the transmitter and the receiver so that the communications device is operable: to measure downlink signals transmitted in a neighbour cell, the neighbour cell forming part of the non-public network portion of the wireless communications network, receiving system information associated with the neighbour cell, the system information comprising a logical portion indication indicating one or more logical portion identities corresponding to respective logical portions of the wireless communications network which can be accessed in the candidate cell, based on the logical portion indication and the result of the measuring, generating a measurement report in respect of the neighbour cell, and transmitting to the infrastructure equipment the measurement report.

Paragraph 34. Circuitry for a communications device for operating in a wireless communications network, the circuitry comprising transmitter circuitry configured to transmit signals via a wireless access interface provided by an infrastructure equipment of the wireless communications network, the wireless communications network comprising a non-public network portion and an infrastructure equipment providing a wireless access interface in a serving cell, receiver circuitry configured to receive signals via the wireless access interface, and controller circuitry configured to control the transmitter circuitry and the receiver circuitry so that the communications device is operable: to measure downlink signals transmitted in a neighbour cell, the neighbour cell forming part of the non-public network portion of the wireless communications network, receiving system information associated with the neighbour cell, the system information comprising a logical portion indication indicating one or more logical portion identities corresponding to respective logical portions of the wireless communications network which can be accessed in the candidate cell, based on the logical portion indication and the result of the measuring, generating a measurement report in respect of the neighbour cell, and transmitting to the infrastructure equipment the measurement report.

Paragraph 35. Infrastructure equipment for use in a wireless communications network, the wireless communications network comprising a public network portion and a non-public network portion, the infrastructure equipment providing a wireless access interface for communicating with a communications device in a cell and a core network entity, the infrastructure equipment comprising a transmitter configured to transmit signals to the communications device via the wireless access interface in the cell, a receiver configured to receive data from the communications device, and a controller configured to control the transmitter and the receiver so that the infrastructure equipment is operable: to receive from the core network entity an enhanced mobility restriction list, the enhanced mobility restriction list comprising an indication of one or more logical portions of the wireless communications network which the communications device is permitted to access via the non-public network portion, to receive from the communications device a measurement report comprising an indication of a candidate cell in the non-public network portion and an indication of one or more logical portions accessible via the candidate cell, to determine, based on the measurement report and the enhanced mobility restriction list, that the communications device is permitted to access at least one logical portion of the wireless communications network via the candidate cell, and in response to the determining, to initiate a handover of the communications device to the candidate cell.

Paragraph 36. Circuitry for an infrastructure equipment for use in a wireless communications network, the wireless communications network comprising a public network portion and a non-public network portion, the infrastructure equipment providing a wireless access interface for communicating with a communications device in a cell and a core network entity, the circuitry comprising transmitter circuitry configured to transmit signals to the communications device via the wireless access interface in the cell, receiver circuitry configured to receive data from the communications device, and controller circuitry configured to control the transmitter circuitry and the receiver circuitry so that the infrastructure equipment is operable: to receive from the core network entity an enhanced mobility restriction list, the enhanced mobility restriction list comprising an indication of one or more logical portions of the wireless communications network which the communications device is permitted to access via the non-public network portion, to receive from the communications device a measurement report comprising an indication of a candidate cell in the non-public network portion and an indication of one or more logical portions accessible via the candidate cell, to determine, based on the measurement report and the enhanced mobility restriction list, that the communications device is permitted to access at least one logical portion of the wireless communications network via the candidate cell, and in response to the determining, to initiate a handover of the communications device to the candidate cell.

Paragraph 37. Infrastructure equipment for use in a wireless communications network, the wireless communications network comprising a public network portion and a non-public network portion, the infrastructure equipment providing a wireless access interface for communicating with a communications device in a cell and a core network entity, the infrastructure equipment comprising a transmitter configured to transmit signals to the communications device via the wireless access interface in the cell, a receiver configured to receive data from the communications device, and a controller configured to control the transmitter and the receiver so that the infrastructure equipment is operable: to receive from the core network entity an enhanced mobility restriction list, the enhanced mobility restriction list comprising an indication of one or more logical portions of the wireless communications network which the communications device is permitted to access via the non-public network portion, to determine, based on the enhanced mobility restriction list, that the communications device is permitted to perform autonomous cell reselection to a candidate cell, in response to the determining that the communications device is permitted to perform autonomous cell reselection to the candidate cell, to form cell reselection information indicating that the communications device is permitted to perform autonomous cell reselection to the candidate cell, and to transmit the cell reselection information to the communications device.

Paragraph 38. Circuitry for an infrastructure equipment for use in a wireless communications network, the wireless communications network comprising a public network portion and a non-public network portion, the infrastructure equipment providing a wireless access interface for communicating with a communications device in a cell and a core network entity, the circuitry comprising transmitter circuitry configured to transmit signals to the communications device via the wireless access interface in the cell, receiver circuitry configured to receive data from the communications device, and controller circuitry configured to control the transmitter circuitry and the receiver circuitry so that the infrastructure equipment is operable: to receive from the core network entity an enhanced mobility restriction list, the enhanced mobility restriction list comprising an indication of one or more logical portions of the wireless communications network which the communications device is permitted to access via the non-public network portion, to determine, based on the enhanced mobility restriction list, that the communications device is permitted to perform autonomous cell reselection to a candidate cell, in response to the determining that the communications device is permitted to perform autonomous cell reselection to the candidate cell, to form cell reselection information indicating that the communications device is permitted to perform autonomous cell reselection to the candidate cell, and to transmit the cell reselection information to the communications device.

Paragraph 39. A core network entity for operating in a wireless communications network, the wireless communications network having a public network portion and a non-public network portion and comprising the core network entity and an infrastructure equipment providing a wireless access interface for communicating with a communications device, the core network entity comprising a controller configured to control the core network element so that the core network element is operable: to receive a registration request from the infrastructure equipment, the registration request associated with a subscription associated with the communications device, based on the subscription, to determine one or more logical portions of the wireless communications network to which the communications device is permitted access via the non-public network portion, and to transmit to the infrastructure equipment an enhanced mobility restriction list, the enhanced mobility restriction list comprising an indication of the one or more logical portions of the wireless communications network which the communications device is permitted to access via the non-public network portion.

Paragraph 40. Circuitry for a core network entity for operating in a wireless communications network, the wireless communications network having a public network portion and a non-public network portion and comprising the core network entity and an infrastructure equipment providing a wireless access interface for communicating with a communications device, the circuitry comprising controller circuitry configured to control the core network element so that the core network element is operable: to receive a registration request from the infrastructure equipment, the registration request associated with a subscription associated with the communications device, based on the subscription, to determine one or more logical portions of the wireless communications network to which the communications device is permitted access via the non-public network portion, and to transmit to the infrastructure equipment an enhanced mobility restriction list, the enhanced mobility restriction list comprising an indication of the one or more logical portions of the wireless communications network which the communications device is permitted to access via the non-public network portion.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," RAN #81.
[2] Holma H. and Toskala A, "LTE for UMTS OFDMA and SC-FDMA based radio access", John Wiley and Sons, 2009
[3] 3GPP TS 23.501 "System architecture for the 5G System (5GS)", Release 16
[4] 3GPP TS 38.413
[5] 3GPP TS 33.501
[6] 3GPP TS 38.300
[7] Co-pending European Patent Application EP19188926.0

The invention claimed is:

1. A method of selecting a cell in a wireless communications network by a communications device, the method comprising:

receiving composite system information associated with a candidate cell, the composite system information comprising a logical portion indication indicating one or more logical portion identities corresponding to respective logical portions of the wireless communications network which can be accessed in the candidate cell, one or more of the logical portion identities being a slice identifier corresponding to a network slice, a portion of the composite system information being included in a master information block (MIB) and an other portion of the composite system information being including in a system information block (SIB) separate from the MIB, determining that the candidate cell is a non-public cell to which access is restricted based on the composite system information included in the MIB and the SIB, determining that the communications device is not permitted to access any of the logical portions identified in the logical portion indication, and in response to determining that the communications device is not permitted to access any of the logical portions identified in the logical portion indication, selecting as a new serving cell a cell different from the candidate cell.

2. A method according to claim 1, wherein one or more of the logical portion identities is an access point name.

3. A method according to claim 1, wherein the candidate cell includes a first carrier frequency, the composite system information comprises an intra-frequency reselection indicator indicating that, in the event that the communications device candidate cell is not permitted to access the candidate cell, the communications device is permitted to select as a new serving cell another cell operating at the first carrier frequency, and the selected different cell includes the first carrier frequency.

4. A method according to claim 1, the method comprising receiving, in a serving cell from a serving infrastructure equipment of the wireless communications network, cell reselection information comprising an indication of one or more non-public network cells which the communications device is not permitted to access.

5. A method according to claim 4, wherein the cell reselection information is formed by the serving infrastructure equipment in accordance with an enhanced mobility restriction list comprising an indication of one or more logical portions of the wireless communications network which the communications device is permitted to access received by the serving infrastructure equipment.

6. A method according to claim 4, wherein the receiving the cell reselection information occurs while the communications device is in a connected mode in which data can be transmitted to or by the communications device in the serving cell.

7. A method according to claim 1, wherein the selecting as the new serving cell the cell different from the candidate cell is performed while the communications device is in an inactive mode in which a radio connection with the serving cell is suspended.

* * * * *